US009547122B2

(12) United States Patent
Hayashi

(10) Patent No.: US 9,547,122 B2
(45) Date of Patent: Jan. 17, 2017

(54) MULTI-CORE OPTICAL FIBER

(71) Applicant: SUMITOMO ELECTRIC INDUSTRIES, LTD., Osaka-shi, Osaka (JP)

(72) Inventor: Tetsuya Hayashi, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 140 days.

(21) Appl. No.: 13/726,806

(22) Filed: Dec. 26, 2012

(65) Prior Publication Data

US 2013/0170804 A1    Jul. 4, 2013

Related U.S. Application Data

(60) Provisional application No. 61/586,189, filed on Jan. 13, 2012.

(30) Foreign Application Priority Data

Dec. 28, 2011    (JP) .................................. 2011-288494

(51) Int. Cl.
G02B 6/36 (2006.01)
G02B 6/036 (2006.01)
G02B 6/02 (2006.01)

(52) U.S. Cl.
CPC ........... *G02B 6/036* (2013.01); *G02B 6/02042* (2013.01); *G02B 6/02395* (2013.01)

(58) Field of Classification Search
CPC .. G02B 6/02042; G02B 6/02395; G02B 6/036
See application file for complete search history.

(56) References Cited

U.S. PATENT DOCUMENTS 3,997,241 A   12/1976  Nishida et al.
RE32,475 E    8/1987   Nishida et al.
(Continued)

FOREIGN PATENT DOCUMENTS

EP    0611973    8/1994
EP    2365366    9/2011
(Continued)

OTHER PUBLICATIONS

Katsuhiro Takenaga, et al., "Characteristics of Trench-Assisted Multi-Core Fiber," IEICE Technical Report, vol. 111, No. 181, OCS2011-46, Aug. 18, 2011, pp. 7-10. (with attached partial English-language translation).
(Continued)

*Primary Examiner* — Ryan Lepisto
*Assistant Examiner* — Mary A El Shammaa
(74) *Attorney, Agent, or Firm* — Drinker Biddle & Reath LLP

(57) ABSTRACT

The present invention relates to a multi-core optical fiber that can realize suppression of crosstalk on an easy and inexpensive basis. The multi-core optical fiber is provided with a plurality of core portions extending along a central axis of the fiber, a common cladding portion integrally holding the core portions inside, a coating layer surrounding the common cladding portion, and a bend applying portion. The bend applying portion, as an example, is provided on a partial region of an outer periphery of the coating layer and applies bending stress to a glass region.

13 Claims, 13 Drawing Sheets

(56) References Cited

U.S. PATENT DOCUMENTS

| | | | |
|---|---|---|---|
| 4,711,523 A * | 12/1987 | Iri et al. | 385/109 |
| 6,278,828 B1 * | 8/2001 | Stocklein et al. | 385/123 |
| 6,853,780 B1 * | 2/2005 | Brandi et al. | 385/104 |
| 7,120,339 B2 * | 10/2006 | Varnham et al. | 385/123 |
| 7,916,989 B2 * | 3/2011 | Bringuier et al. | 385/109 |
| 8,064,738 B2 * | 11/2011 | Zandiyeh et al. | 385/12 |
| 2009/0324242 A1 * | 12/2009 | Imamura | 398/142 |
| 2013/0188949 A1 * | 7/2013 | Fini et al. | 398/28 |

FOREIGN PATENT DOCUMENTS

| | | |
|---|---|---|
| JP | S50-015565 | 2/1975 |
| JP | S55-025643 | 7/1980 |
| JP | S56-052706 | 5/1981 |
| JP | S57-020707 | 2/1982 |
| JP | H3-012614 | 1/1991 |
| JP | H7-102186 | 4/1995 |
| JP | H9-043465 | 2/1997 |
| JP | 2001-183558 | 7/2001 |
| JP | 2001-294449 | 10/2001 |
| JP | 2004-086026 | 3/2004 |
| JP | 2010-286548 | 12/2010 |
| JP | 2011-197661 | 10/2011 |
| WO | WO 2009/107414 | 9/2009 |
| WO | WO 2011/114795 | 9/2011 |

OTHER PUBLICATIONS

Tetsuya Hayashi et al., "Design and fabrication of ultra-low cross-talk and low-loss multi-core fiber," Optics Express, Aug. 15, 2011, pp. 16576-16592, vol. 19, No. 17.

Tetsuya Hayashi et al., "Microbending-induced Crosstalk Increase in Heterogeneous Multi-Core Fiber," ECOC Technical Digest, Jul. 27, 2011, Mo.1.LeCervin.3.

Tetsuya Hayashi et al., "Crosstalk Variation of Multi-Core Fibre due to Fibre Bend," ECOC, Sep. 19-23, 2010, Torino, Italy, We.8.F.6.

English-language translation of International Preliminary Report on Patentability (IPRP) dated Jul. 31, 2014 that issued in WO Patent Application No. PCT/JP2012/081689.

* cited by examiner

MULTI-CORE OPTICAL FIBER

This application claims the benefit of U.S. Provisional Application No. 61/586,189, filed Jan. 13, 2012, which is incorporated by reference herein in its entirety.

BACKGROUND OF THE INVENTION

Field of the Invention

The present invention relates to a multi-core optical fiber.

Related Background of the Invention

A multi-core optical fiber having a plurality of core portions extending along a central axis of the fiber, in a common cladding portion is expected as an optical transmission line capable of transmitting a large volume of information. Such multi-core optical fiber is required to reduce crosstalk between two neighboring core portions out of the plurality of core portions in the common cladding. With reduction of crosstalk, it becomes feasible to implement transmission of optical signals by use of a longer multi-core optical fiber. As another advantage, the crosstalk reduction allows reduction in core pitch between two neighboring core portions and thus allows a larger number of core portions to be arranged in the common cladding; as a result, it becomes feasible to transmit a much larger volume of information.

Non Patent Document 1 (Tetsuya Hayashi, et al, Optics Express, Vol. 19, No. 17, pp. 16576-16592 (2011)), Non Patent Document 2 (Tetsuya Hayashi, et al, ECOC 2011, Mo.1.LeCervin.3), and Non Patent Document 3 (Tetsuya Hayashi, et al, ECOC 2010, We.8.F.6) describe the reports on relationship between bending of the multi-core optical fiber (macrobend or microbend) and crosstalk. Non Patent Document 1 reports the relationship between bending and crosstalk in the multi-core optical fiber wherein the plurality of core portions in the common cladding have the structure of the same kind. Non Patent Documents 2 and 3 report the relationship between bending and crosstalk in the multi-core optical fiber wherein two neighboring core portions out of the plurality of core portions in the common cladding have respective structures of different kinds.

SUMMARY OF THE INVENTION

The inventor conducted research on the conventional multi-core optical fiber and found the problem as described below.

Namely, according to Non Patent Documents 1-3 above, reduction of crosstalk in the multi-core optical fiber is expected by appropriately setting bending of the multi-core optical fiber. However, for example, when the multi-core optical fiber is one already laid, it is not easy to provide a mechanism for applying an appropriate bend to the multi-core optical fiber, which also raises a problem of causing an increase in cost.

The present invention has been accomplished in order to solve the above problem and it is an object of the present invention to provide a multi-core optical fiber capable of implementing suppression of crosstalk on an easy and inexpensive basis.

A multi-core optical fiber according to an embodiment of the present invention comprises a plurality of core portions, a common cladding portion, a coating layer, and a bend applying portion, as a first aspect. Each of the core portions extends along a central axis of the multi-core optical fiber. The common cladding portion integrally holds the core portions inside in a state in which the core portions are separated at predetermined intervals from each other. Furthermore, the cladding portion has a refractive index lower than that of each of the core portions. The coating layer is provided so as to surround an outer periphery of the common cladding portion. The bend applying portion is provided at least either on an outer periphery of the coating layer or in the interior of the coating layer, in order to apply bending stress to a glass region including the core portions and the common cladding portion.

As a second aspect applicable to the first aspect, the coating layer may include a plurality of layers. In this case, the bend applying portion may be provided at an interface between neighboring layers out of the plurality of layers.

As a third aspect applicable to at least any one of the first and second aspects, positions of the bend applying portion in respective cross sections of the multi-core optical fiber normal to the central axis, the cross sections being at different positions along the central axis, vary along the central axis. Namely, a position of the bend applying portion in a cross section of the multi-core optical fiber perpendicular to the central axis at a first point on the central axis is different from a position of the bend applying portion in a cross section of the multi-core optical fiber perpendicular to the central axis at a second point different from the first point on the central axis.

As a fourth aspect applicable to at least any one of the first to third aspects, the bend applying portion is provided in the interior of the coating layer and may contain a granular substance consisting of a material having a Young's modulus higher than that of the coating layer.

Furthermore, as a fifth aspect applicable to at least any one of the first to fourth aspects, in a configuration wherein the bend applying portion is provided on the outer periphery of the coating layer, a thickness of the bend applying portion in the radial direction of the multi-core optical fiber is preferably not more than 77.5 μM. In a sixth aspect applicable to at least any one of the first to fifth aspects, the bend applying portion preferably has a shape continuously extending in a direction along the central axis. In this case, the bend applying portion may include a plurality of bend applying elements separated from each other in the circumferential direction. As a seventh aspect applicable to at least any one of the first to fifth aspects, the bend applying portion may include a plurality of bend applying elements provided at least either on the outer periphery of the coating layer or in the interior of the coating layer in a state in which the bend applying elements are separated from each other in a direction along the central axis.

As an eighth aspect applicable to at least any one of the first to seventh aspects, the multi-core optical fiber may further comprise a plurality of depressed layers, in addition to the plurality of core portions and the common cladding portion. In this case, the plurality of depressed layers are provided corresponding to the respective core portions on outer peripheries of the respective core portions. Preferably, each of the depressed layers is located between the corresponding core portion and the common cladding portion and has a refractive index lower than that of the common cladding portion.

As a ninth aspect applicable to at least any one of the first to seventh aspects, the multi-core optical fiber may further comprise a plurality of trench layers and a plurality of inner cladding layers, in addition to the plurality of core portions and the common cladding portion. In this case, the plurality of trench layers are provided corresponding to the respective core portions on outer peripheries of the respective core portions. In this case, each of the trench layers is located between the corresponding core portion and the common cladding portion and has a refractive index lower than that of the common cladding portion. The plurality of inner cladding layers are provided corresponding to the respective core portions on the outer peripheries of the respective core portions. Preferably, each of the inner cladding layers is located between the corresponding core portion and the corresponding trench layer and has a refractive index lower than that of the corresponding core portion and higher than that of the corresponding trench layer.

The multi-core optical fiber having the structure as described above is applicable to a variety of optical components, e.g., a multi-core optical fiber tape, a multi-core optical fiber cable, and so on. A multi-core optical fiber tape according to a tenth aspect comprises a plurality of multi-core optical fiber elements and a resin coat. The plurality of multi-core optical fiber elements have the same structure as the multi-core optical fiber according to at least any one of the first to ninth aspects. The resin coat integrally covers the multi-core optical fiber elements in a state in which the multi-core optical fiber elements are separated at predetermined intervals from each other.

A multi-core optical fiber cable according to an eleventh aspect is a cable incorporating the multi-core optical fiber according to at least any one of the first to ninth aspects, which can be applied to either of a tight cable and a loose cable. Then, as a twelfth aspect applicable to the eleventh aspect, the tight cable further comprises a cable jacket in close contact with the outer periphery of the multi-core optical fiber, so as to apply a lateral pressure to the outer periphery of the multi-core optical fiber. The cable jacket may be composed of a plurality of layers. As a thirteenth aspect applicable to the eleventh aspect, the loose cable further comprises a sheath having a space to house the multi-core optical fiber, without applying any lateral pressure to the outer periphery of the multi-core optical fiber.

DESCRIPTION OF THE PREFERRED EMBODIMENTS

Embodiments of the present invention will be described below in detail with reference to the accompanying drawings. The same elements will be denoted by the same reference signs in the description of the drawings, without redundant description.

First Embodiment

Figure 1:
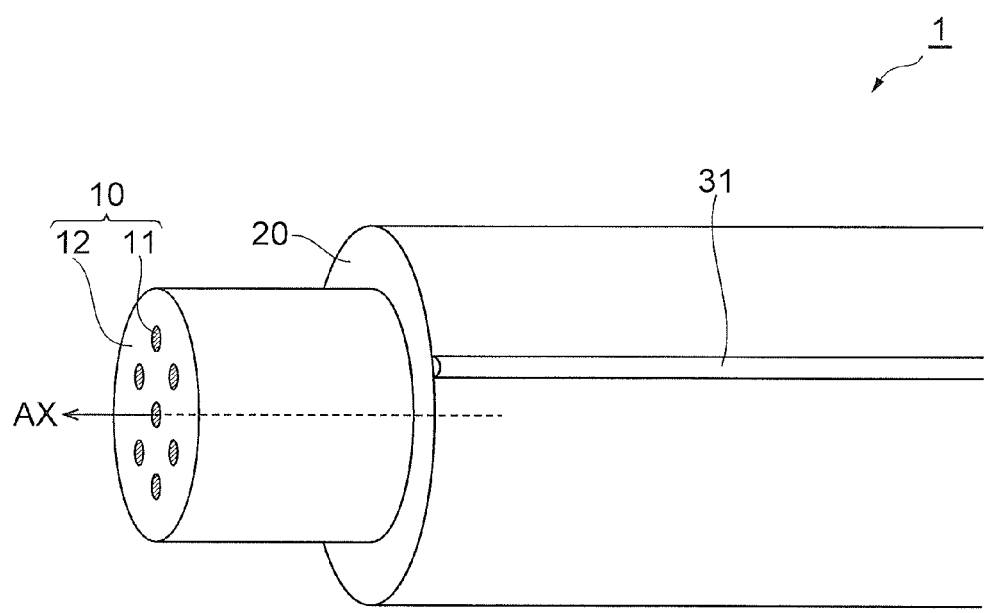
FIG. 1 is a perspective view showing a configuration of a multi-core optical fiber according to the first embodiment.
Figure 2A:
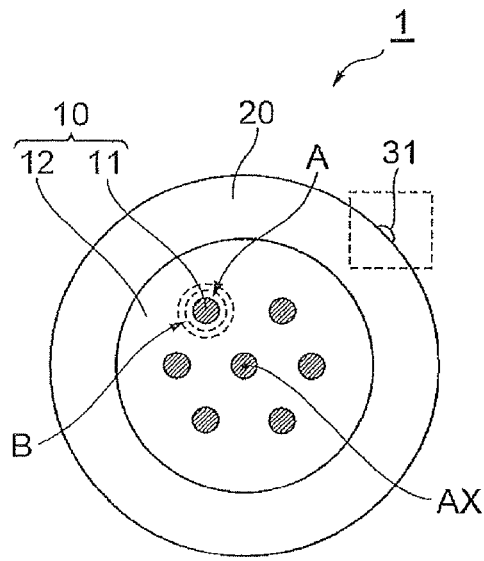
FIGS. 2A to 2C are sectional views showing the configuration of the multi-core optical fiber according to the first embodiment.
Figure 2B:
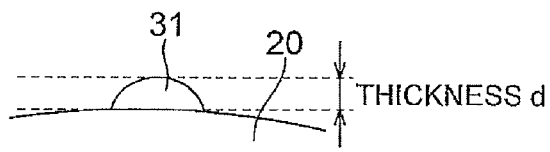
Figure 2C:
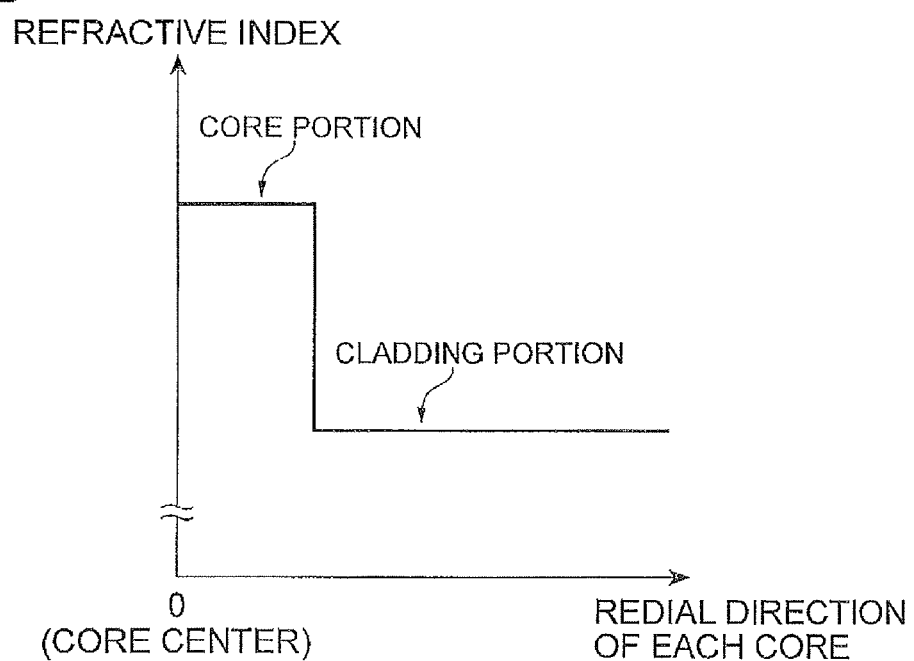

FIG. 1 is a perspective view showing a configuration of a multi-core optical fiber 1 according to the first embodiment. FIG. 2A is a cross-sectional view showing the configuration of the multi-core optical fiber 1 according to the first embodiment. FIG. 2B is an enlarged view of a part (region enclosed in a dashed line) in FIG. 2A and FIG. 2C a drawing showing a preferred example of a refractive index profile around each core part. As shown in FIG. 1, the multi-core optical fiber 1 according to the first embodiment has a plurality of (seven in FIG. 1) core portions 11 extending along a central axis AX thereof (fiber axis), a common cladding portion 12 surrounding each of outer peripheries of the core portions 11, a coating layer 20 surrounding an outer periphery of the common cladding portion 12, and a microbend applying portion 31 provided on an outer periphery (outer surface) of the coating layer 20.

In the cross section of the multi-core optical fiber 1 (a plane normal to the central axis AX), as shown in FIG. 2A, one core portion 11 out of the seven core portions 11 is arranged at the center and the other six core portions 11 are arranged at equal intervals on the circumference of a circle centered at the central core. Namely, the seven core portions 11 are arranged at respective grid points of a triangle grid. Each core portion 11 has the refractive index higher than that of the cladding portion 12 and can guide light (cf. FIG. 2C). The seven core portions 11 have substantially the same structure as to the core diameter and refractive index profile and have substantially equal optical transmission properties.

A glass region 10 including the core portions 11 and cladding portion 12 is comprised of silica glass. The coating layer 20 surrounding the outer periphery of the cladding portion 12 is comprised of resin. The coating layer 20 may have a single-layer structure or a multilayer structure, and may include a colored layer. In the first embodiment, the microbend applying portion 31 has a shape continuously extending in the longitudinal direction of the multi-core optical fiber 1 (direction along the central axis AX, which will be referred to hereinafter as fiber longitudinal direction), in a partial region on the outer periphery of the coating layer 20. The thickness d of the microbend applying portion 31 means the thickness along the radial direction of the multi-core optical fiber 1, as shown in FIG. 2B, and the thickness d in the radial direction is not less than a predetermined value. The microbend applying portion 31 having this structure can apply a microbend to the glass region 10. The core arrangement in the glass region 10 (core arrangement on the cross section normal to the central axis AX) may be twisted around the central axis AX along the fiber longitudinal direction. The thickness d in the radial direction or the width in the circumferential direction of the microbend applying portion 31 may be varied in each of sections of the microbend applying portion 31 extending along the fiber longitudinal direction.

When the microbend applying portion 31 applies the microscopic bend (microbend) to the glass region 10, a small-diameter macrobend is produced at a certain rate in the fiber longitudinal direction in the glass region 10. This macrobend increases a difference between the propagation constants of guided light in two neighboring core portions 11 out of the plurality of core portions 11, so as to reduce crosstalk between these two core portions 11. Such reduction of inter-core crosstalk enables optical signal transmission by a longer multi-core optical fiber. In another aspect, the reduction of inter-core crosstalk allows decrease in core pitch between two adjacent core portions and thus allows a larger number of core portions to be arranged in the common cladding; as a result, it becomes feasible to transmit a much larger volume of information.

The present embodiment does not have to be provided with a mechanism for applying an appropriate bend to the multi-core optical fiber, separately from the microbend applying portion. For this reason, crosstalk can be suppressed on an easy and inexpensive basis. When a multi-core optical fiber cable is configured incorporating the multi-core optical fiber according to the present embodiment, microbend stress is applied to the multi-core optical fiber and therefore there is no need for separately providing a mechanism for applying an appropriate bend to the multi-core optical fiber, separately from the microbend applying portion. The cable may have a form like a cord as long as it has a member covering the outer periphery of the multi-core optical fiber.

Figure 3:
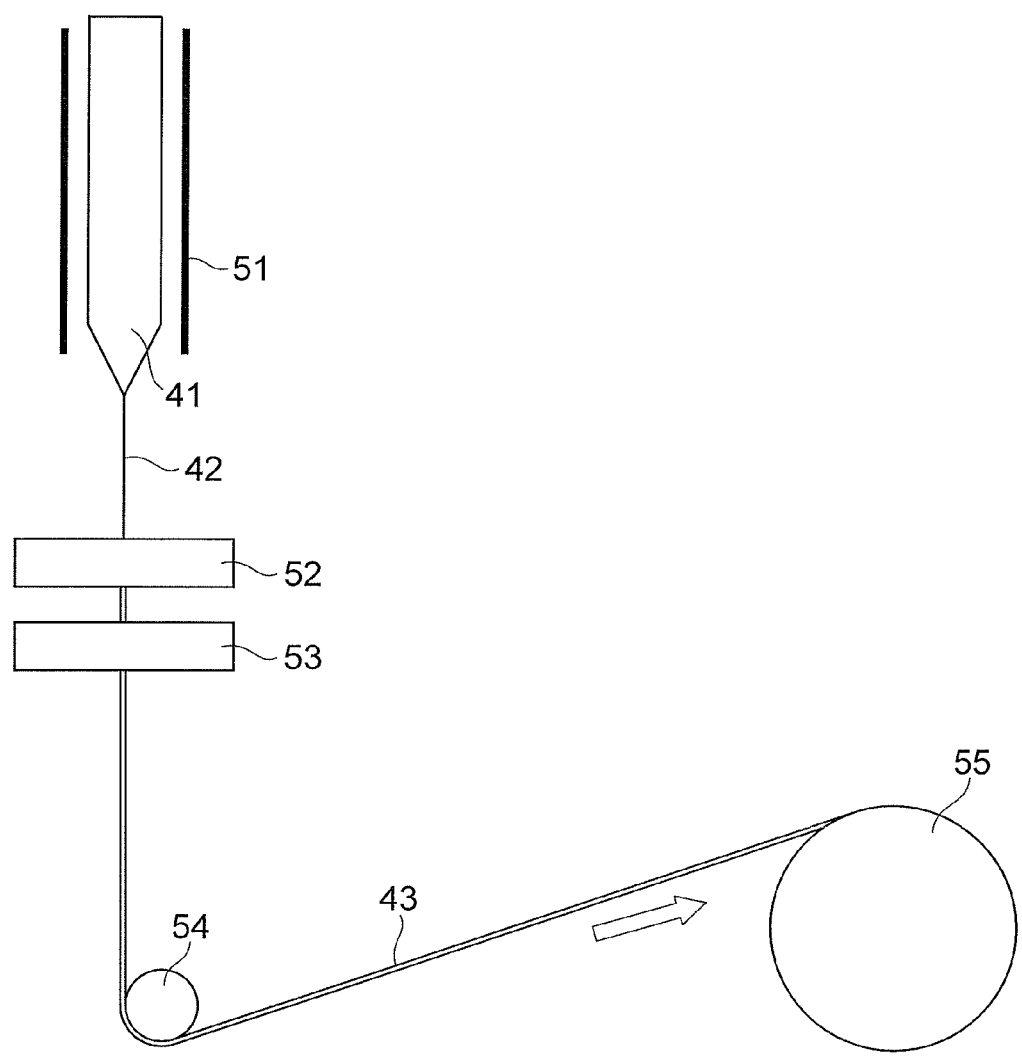
FIG. 3 is a drawing for explaining an example of a method for manufacturing the multi-core optical fiber according to the first embodiment.

The multi-core optical fiber 1 of the present embodiment can be manufactured as described below. FIG. 3 is a drawing for explaining an example of a method for manufacturing the multi-core optical fiber 1. A lower end of optical fiber preform 41 set in a drawing furnace 51 is heated and melted to produce a drawn bare optical fiber 42. The bare optical fiber 42 is guided in order through a coating device 52 and a microbend applying portion forming device 53 to obtain an optical fiber 43. The coating device 52 applies a resin to the periphery of the cladding of the bare optical fiber 42 and cures the resin to form a coating layer. The microbend applying portion forming device 53 forms the microbend applying portion on the outer periphery of the coating layer. Then the optical fiber 43 is guided via a guide roller 54 to be wound up on a second bobbin 55. The optical fiber 43 manufactured as described above serves as the multi-core optical fiber 1 according to the present embodiment.

Figure 4:
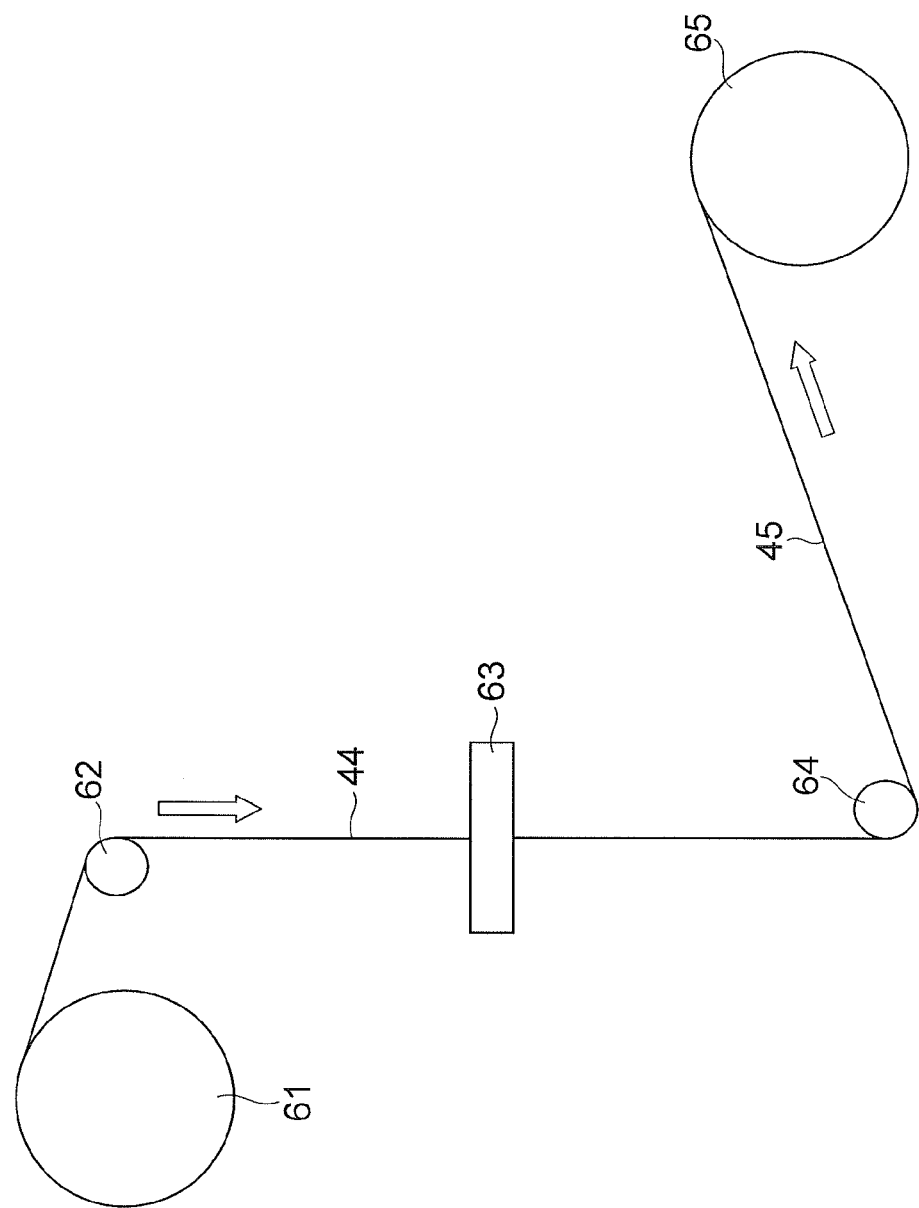
FIG. 4 is a drawing for explaining another example of the method for manufacturing the multi-core optical fiber according to the first embodiment.

In another method, the multi-core optical fiber 1 of the present embodiment can also be manufactured as described below. FIG. 4 is a drawing for explaining another example of the manufacturing method of the multi-core optical fiber 1. In this example, an optical fiber 44 after formation of the coating layer is wound on a first bobbin 61. The optical fiber 44 unwound from this first bobbin 61 is guided in order via a guide roller 62 and a microbend applying portion forming device 63 to produce an optical fiber 45. The microbend applying portion forming device 63 forms the microbend applying portion on the outer periphery of the coating layer. Then the optical fiber 45 is guided via a guide roller 64 to be wound up on a second bobbin 65. The optical fiber 45 manufactured in this manner serves as the multi-core optical fiber 1 according to the present embodiment.

It is noted that a coloring device to form a colored layer may be provided before or after the microbend applying portion forming device. Furthermore, microbend applying portions formed by the microbend applying portion forming device may have different colors for respective fibers or different shapes for respective fibers. This configuration allows individual multi-core optical fibers to be identified in an optical cable incorporating the plurality of multi-core optical fibers.

If the thickness d of the microbend applying portion is too large, the multi-core optical fiber cannot be regularly wound up during an operation of winding the multi-core optical fiber around the bobbin. For example, in a case where a fiber spacing per turn in winding of the multi-core optical fiber on the bobbin is 0.4 mm (i.e., 400 μm) and where the fiber coating diameter is 245 μm, the thickness d of the microbend applying portion is preferably not more than 77.5 μm (=(400−245)/2).

Second Embodiment

Figure 5:
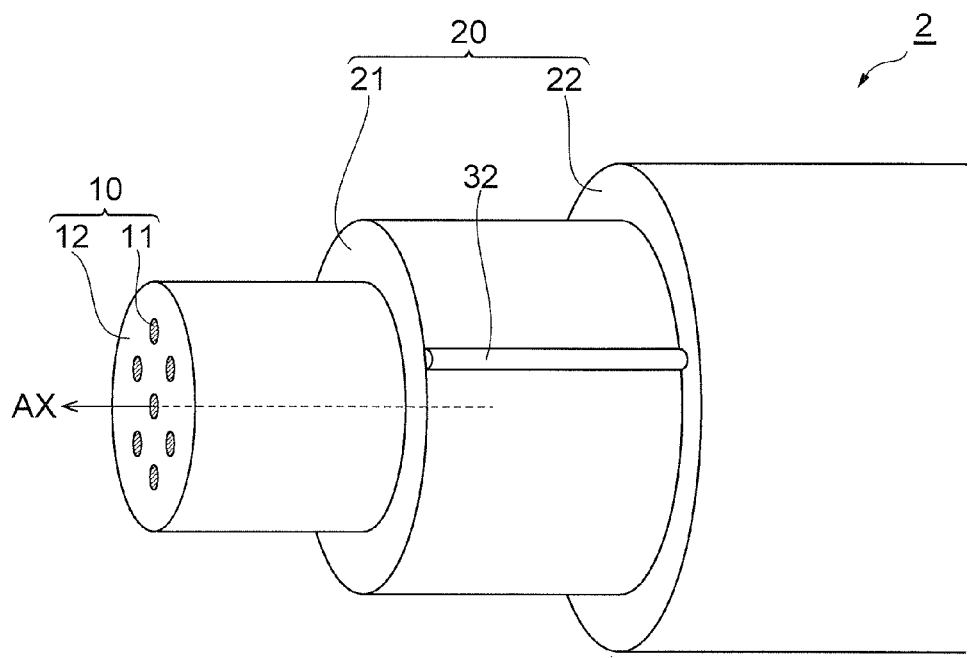
FIG. 5 is a perspective view showing a configuration of a multi-core optical fiber according to the second embodiment.

FIG. 5 is a perspective view showing a configuration of a multi-core optical fiber 2 according to the second embodiment. As shown in FIG. 5, the multi-core optical fiber 2 is provided with the plurality of (seven in FIG. 5) core portions 11 extending along the central axis AX, the common cladding portion 12 surrounding each of the outer peripheries of the core portions 11, the coating layer 20 surrounding the outer periphery of the common cladding portion 12, and a microbend applying portion 32 provided in the interior of the coating layer 20. The coating layer 20 has a two-layer structure consisting of a first coating layer 21 surrounding the outer periphery of the common cladding portion 12 and a second coating layer 22 surrounding an outer periphery of the first coating layer 21, and the microbend applying portion 32 is provided (at an interface) between these first coating layer 21 and second coating layer 22.

In the present embodiment, the microbend applying portion 32 is provided on a partial region of the interface between the first coating layer 21 and the second coating layer 22 and has a shape continuously extending in the fiber longitudinal direction. The thickness d (cf. FIG. 2B) in the radial direction of the microbend applying portion 32 is not less than the predetermined value. The microbend applying portion 32 of this structure can apply a microbend to the glass region 10. The core arrangement in the glass region 10 (core arrangement on the cross section normal to the central axis AX) may be twisted around the central axis AX along the fiber longitudinal direction. The thickness d in the radial direction or the width in the circumferential direction of the microbend applying portion 32 may be varied in each of sections of the microbend applying portion 31 extending along the fiber longitudinal direction. Each of the first coating layer 21 and the second coating layer 22 may be comprised of a plurality of coating layers.

The multi-core optical fiber 2 of the present embodiment can also achieve the same operational effect as the multi-core optical fiber 1 of the first embodiment. The multi-core optical fiber 2 of the present embodiment can be manufactured by forming the second coating layer with a second coating device further provided after the microbend applying portion forming device 53 in FIG. 3.

Third Embodiment

Figure 6:
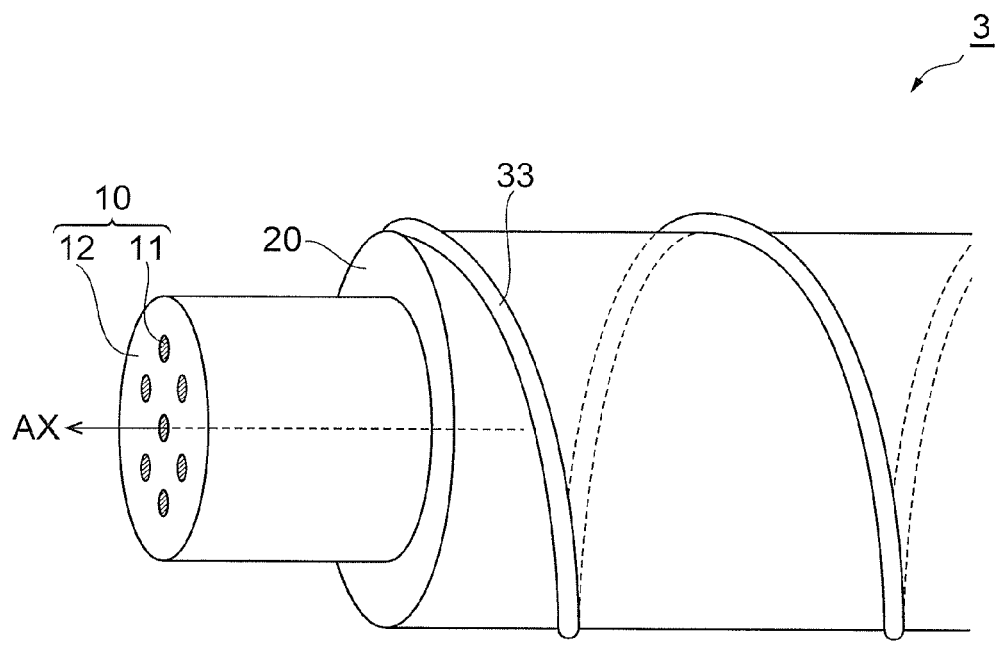
FIG. 6 is a perspective view showing a configuration of a multi-core optical fiber according to the third embodiment.

FIG. 6 is a perspective view showing a configuration of a multi-core optical fiber 3 according to the third embodiment.

As shown in FIG. 6, the multi-core optical fiber 3 is provided with the plurality of (seven in FIG. 6) core portions 11 extending along the central axis AX, the common cladding portion 12 surrounding each of the outer peripheries of the core portions 11, the coating layer 20 surrounding the outer periphery of the common cladding portion 12, and a microbend applying portion 33 provided on the outer periphery (outer surface) of the coating layer 20.

In the present embodiment, the microbend applying portion 33 is continuously provided in a helical shape on the outer periphery of the coating layer 20 and has the radial thickness d of not less than the predetermined value. The microbend applying portion 33 of this structure can apply a microbend to the glass region 10. The thickness, width, helical pitch, or twist direction of the microbend applying portion 33 may be varied in each of sections along the fiber longitudinal direction. The microbend applying portion 33 may be provided at the interface between the first coating layer and the second coating layer as in the second embodiment. The helix does not have to be limited only to a helix at a constant pitch in one direction, but may be a helix a rotation direction of which is periodically reversed, or a helix the pitch of which varies in the fiber longitudinal direction. The circumferential position of the microbend applying portion around the central axis may be varied along the fiber longitudinal direction.

The multi-core optical fiber 3 of the present embodiment can also achieve the same operational effect as the multi-core optical fiber 1 of the first embodiment. The multi-core optical fiber 3 of the present embodiment can be manufactured by rotating the optical fiber during passage of the optical fiber through the microbend applying portion forming device in FIG. 3 or in FIG. 4.

Fourth Embodiment

Figure 7:
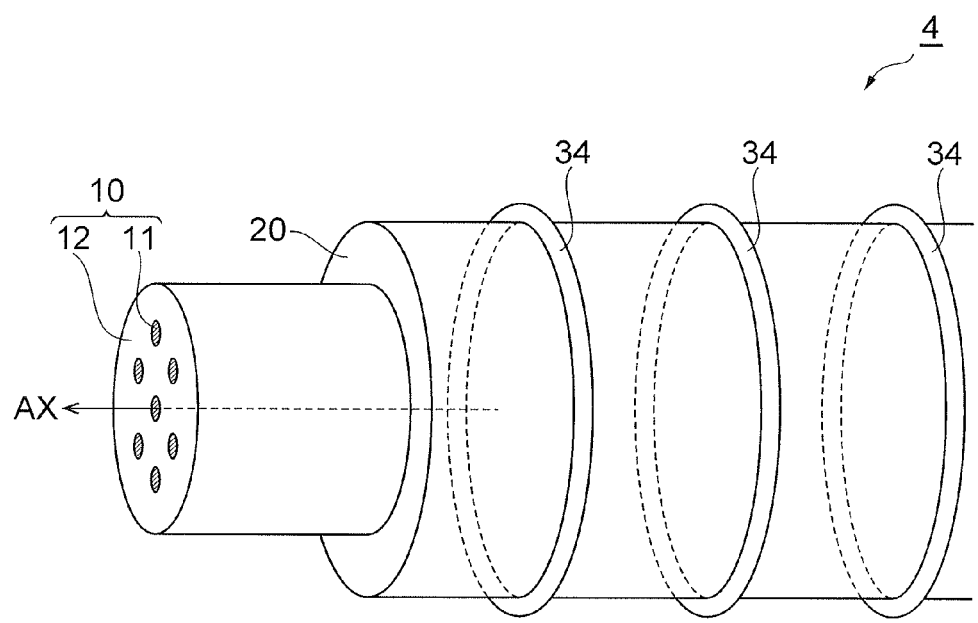
FIG. 7 is a perspective view showing a configuration of a multi-core optical fiber according to the fourth embodiment.

FIG. 7 is a perspective view showing a configuration of a multi-core optical fiber 4 according to the fourth embodiment. In FIG. 7, the multi-core optical fiber 4 is provided with the plurality of (seven in FIG. 7) core portions 11 extending along the central axis AX, the common cladding portion 12 surrounding each of the outer peripheries of the core portions 11, the coating layer 20 surrounding the outer periphery of the common cladding portion 12, and microbend applying portions 34 provided on the outer periphery (outer surface) of the coating layer 20.

In the present embodiment, the microbend applying portions 34 are intermittently provided on the outer periphery of the coating layer 20 along the fiber longitudinal direction and have the radial thickness d of not less than the predetermined value. The microbend applying portions 34 of this structure can apply a microbend to the glass region 10. The thickness, width, or arrangement pitch of the microbend applying portions 34 may be varied along the fiber longitudinal direction. The microbend applying portions 34 may be provided between the first coating layer and the second coating layer as in the second embodiment.

The multi-core optical fiber 4 of the present embodiment can also achieve the same operational effect as the multi-core optical fiber 1 of the first embodiment. The multi-core optical fiber 4 of the present embodiment can be manufactured by forming the microbend applying portions 34 in an intermittent manner on the optical fiber during passage of the optical fiber through the microbend applying portion forming device in FIG. 3 or in FIG. 4.

Fifth Embodiment

Figure 8:
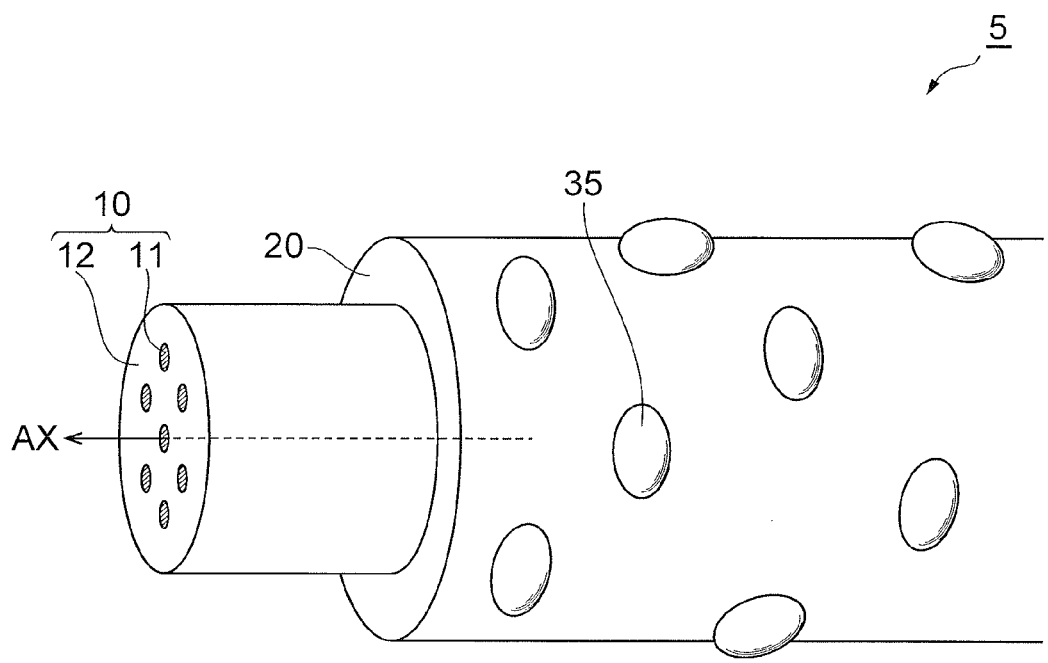
FIG. 8 is a perspective view showing a configuration of a multi-core optical fiber according to the fifth embodiment.

FIG. 8 is a perspective view showing a configuration of a multi-core optical fiber 5 according to the fifth embodiment. In FIG. 8, the multi-core optical fiber 5 is provided with the plurality of (seven in FIG. 8) core portions 11 extending along the central axis AX, the common cladding portion 12 surrounding each of the outer peripheries of the core portions 11, the coating layer 20 surrounding the outer periphery of the common cladding portion 12, and microbend applying portions 35 provided on the outer periphery (outer surface) of the coating layer 20. These microbend applying portions 35 may be arranged at random on the outer periphery of the coating layer 20 (provided that they do not always have to be arranged regularly). In this case, the pitch of microbend applying portions 35 can be set freely.

In the present embodiment, the microbend applying portions 35 are intermittently provided on the outer periphery of the coating layer 20 and have the radial thickness d of not less than the predetermined value. The microbend applying portions 35 of this structure can apply a microbend to the glass region 10. The thickness, width, or arrangement density of the microbend applying portions 35 may be varied in the fiber longitudinal direction. The microbend applying portions 35 may be provided between the first coating layer and the second coating layer as in the second embodiment.

The multi-core optical fiber 4 of the present embodiment can also achieve the same operational effect as the multi-core optical fiber 1 of the first embodiment. The multi-core optical fiber 4 of the present embodiment can be manufactured by forming the microbend applying portions 35 in an intermittent manner on the optical fiber during passage of the optical fiber through the microbend applying portion forming device in FIG. 3 or in FIG. 4.

In the multi-core optical fibers 3-5 of the above-described third to fifth embodiments, the microbend applying portion or microbend applying portions are varied along the fiber longitudinal direction and thus can apply a more microscopic bend to the glass region 10.

Sixth Embodiment

Figure 9A:
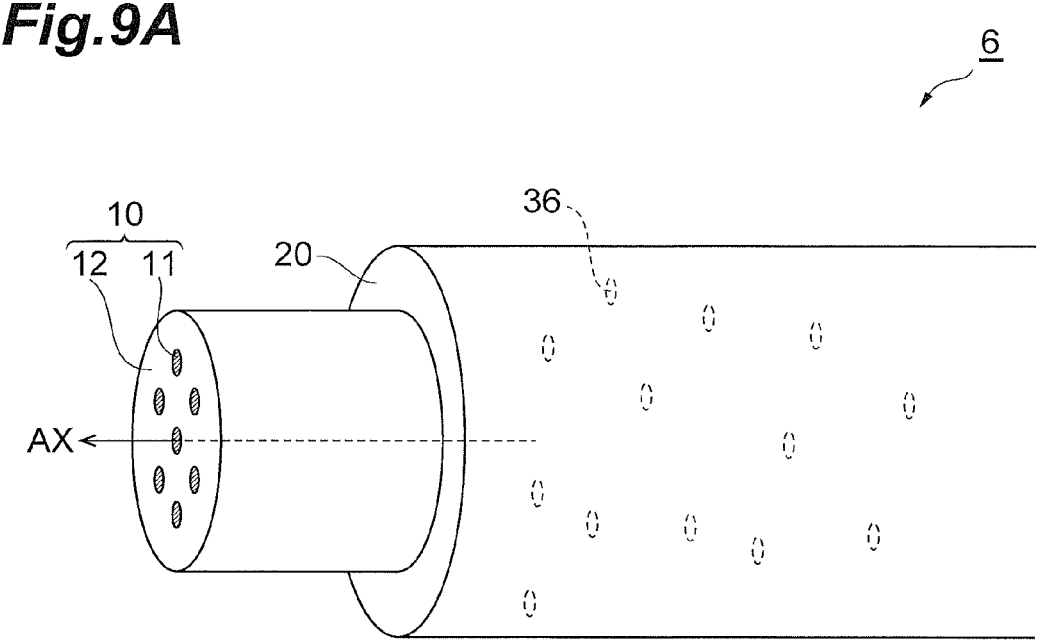
FIGS. 9A and 9B are a perspective view and cross-sectional view showing a configuration of a multi-core optical fiber according to the sixth embodiment.

FIG. 9A is a perspective view showing a configuration of a multi-core optical fiber 6 according to the sixth embodiment. In FIG. 9A, the multi-core optical fiber 6 is provided with the plurality of (seven in FIG. 9A) core portions 11 extending along the central axis AX, the common cladding portion 12 surrounding each of the outer peripheries of the core portions 11, the coating layer 20 surrounding the outer periphery of the common cladding portion 12, and microbend applying portions 36 provided in the interior of the coating layer 20.

Figure 9B:
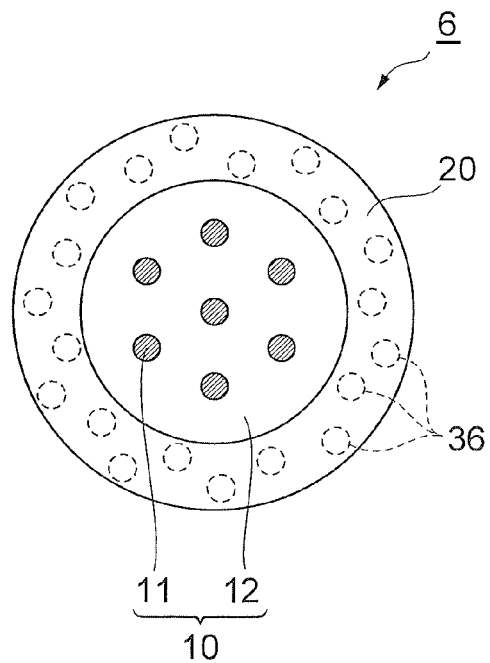

In the present embodiment, the microbend applying portions 36 contain a granular substance discretely arranged at random inside the coating layer 20. In this case, the microbend applying portions 36 exist near an interface between the common cladding portion 12 and the coating layer 20, inside the coating layer 20, and near the outer periphery of the coating layer 20, as shown in FIG. 9B. The granular substance as the microbend applying portions 36 consists of a material with the Young's modulus higher than that of the coating layer 20, i.e., a material harder than the material of the coating layer 20. The granular substance as the microbend applying portions 36 may be a material in a gel state or in a solid state. The multi-core optical fiber 6 of the present embodiment can also achieve the same operational effect as the multi-core optical fiber 1 of the first embodiment.

The multi-core optical fiber 6 of the present embodiment can be manufactured as described below. A mixture of the resin material to be the coating layer 20, with the material to be the microbend applying portions 36 is applied onto the drawn bare optical fiber and then cured. As a result, the multi-core optical fiber 6 can be manufactured. In another method, the mixture of the resin material to be the coating layer 20, with the resin material to be the microbend applying portions 36 is cured at the same time as applied onto the drawn bare optical fiber. In this case, the multi-core optical fiber 6 can also be manufactured.

In any one of the above-described first to sixth embodiments, the microbend applying portion or microbend applying portions are preferably provided throughout the entire length of the multi-core optical fiber. Since this configuration allows the microbend applying portions to apply the microbend throughout the entire length of the multi-core optical fiber, it is more effective to reduction of crosstalk. However, when the microbend is applied throughout the entire length of fiber, there is a possibility of occurrence of increase in loss induced by the microbend depending upon the core structure. Therefore, the microbend applying portions may be provided in an intermittent manner along the fiber longitudinal direction.

In a general optical fiber the coating layer has a two-layer structure, in which the first coating layer positioned inside is made of a soft resin and the second coating layer positioned outside is made of a resin harder than the first coating layer. Since the Young's modulus of the resin of the second coating layer is approximately 1 GPa, the microbend can be efficiently applied to the multi-core optical fiber when the Young's modulus of the microbend applying portion in each of the above embodiments is not less than 1 GPa (i.e., when it has the hardness equal to or higher than that of the resin of the second coating layer).

In each of the first to sixth embodiments, the loss in each core can be increased by the microbend applied to the glass region by the microbend applying portion. The microbend loss is produced by coupling from the fundamental mode for propagation of signal to a higher-order mode or a cladding mode. The smaller the propagation constant difference (which can be replaced by effective index difference) between the fundamental mode and the higher-order mode or cladding mode, the larger the microbend loss. In the multi-mode core optical fibers of the embodiments, therefore, the refractive index profile near each core portion is preferably the refractive index profile as shown in FIG. 10 or in FIG. 11.

Figure 10:
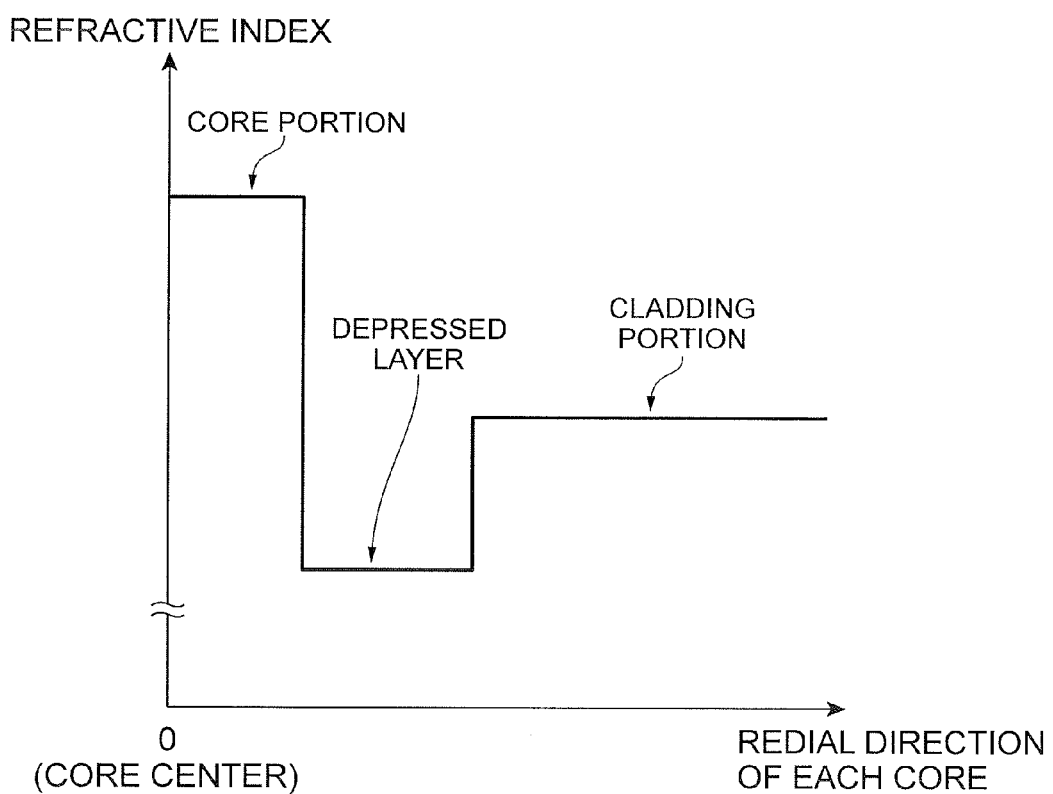
FIG. 10 is a drawing showing a preferred example of a refractive index profile around each core portion in the multi-core optical fiber in each embodiment.
Figure 11:
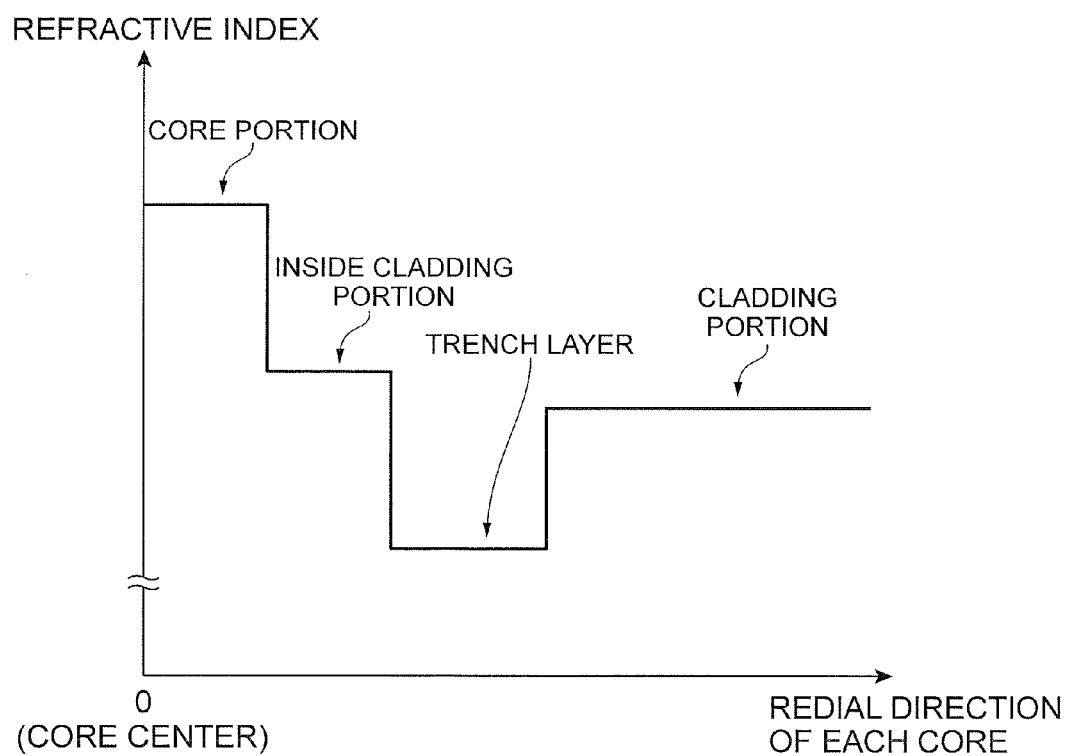
FIG. 11 is a drawing showing another preferred example of a refractive index profile around each core portion in the multi-core optical fiber in each embodiment.

The refractive index profile shown in FIG. 10 is a so-called depressed type. In this depressed type refractive index profile, a depressed layer with the refractive index lower than that of the cladding portion (corresponding to the common cladding 12) is provided around each core portion (corresponding to the core portion 11). In this depressed type refractive index profile, the region A in FIG. 2A denotes the depressed layer and the region B in FIG. 2A denotes a part of the common cladding 12. The refractive index profile shown in FIG. 11 is a so-called trench type. In this trench type refractive index profile, a trench layer with the refractive index lower than that of the cladding portion (corresponding to the common cladding portion 12) is provided around each core portion (corresponding to the core portion 11) and an inner cladding layer with the refractive index lower than that of the core portion and higher than that of the trench layer is further provided between the core portion and the trench layer. In this trench type refractive index profile, the region A in FIG. 2A denotes the inner cladding layer and the region B in FIG. 2A denotes the trench layer. When such core structures are adopted, the effective refractive index of the cladding mode can be lowered to the refractive index of the depressed layer or the trench layer, so as to suppress the microbend loss.

With the use of the multi-core optical fiber having the microbend applying portion to apply the microbend to the glass region consisting of the core portions and the cladding portion, as described above, the inter-core crosstalk of the multi-core optical fiber can be kept low without control on bending of fiber, cord, or cable, even in the case where the multi-core optical fiber is used as it is or in the case where the multi-core optical fiber is used as housed in a cord or a cable without a structure to apply bending.

As examples of application of the multi-core optical fibers of the embodiments, a tape and cables using the multi-core optical fiber will be described below using FIG. 12 and FIGS. 13A and 13B.

Figure 12:
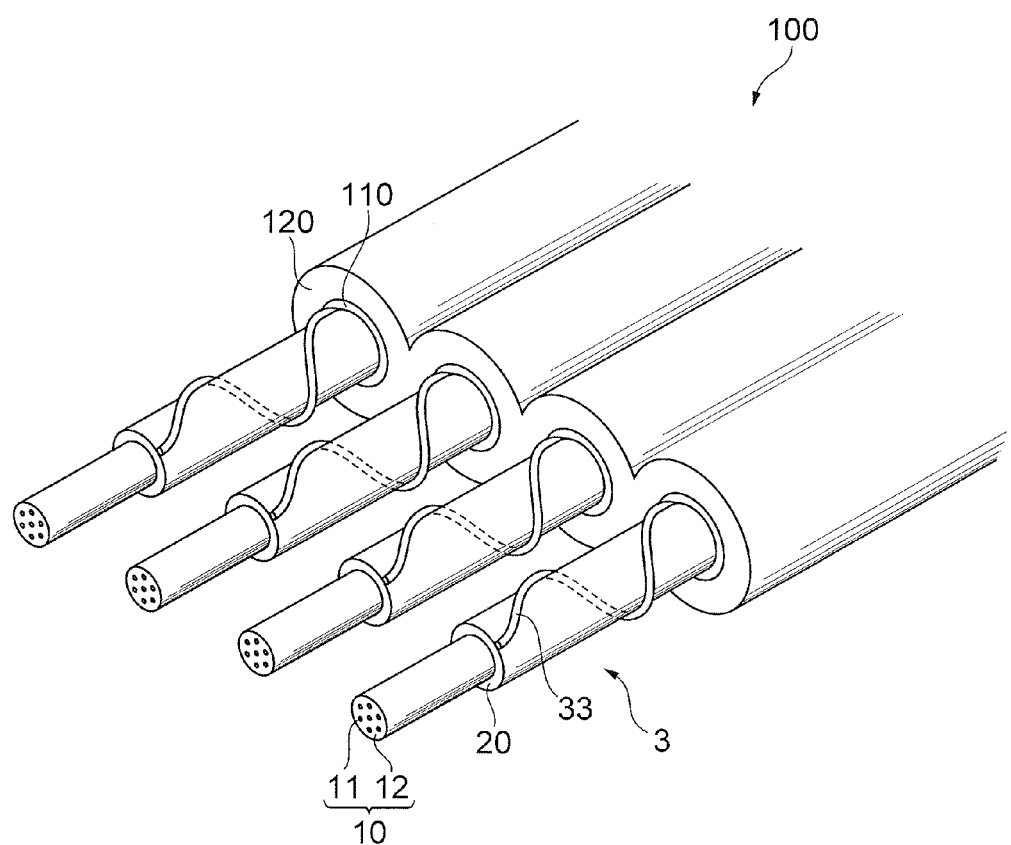
FIG. 12 is a drawing showing a schematic structure of a multi-core optical fiber tape according to an embodiment of the present invention.

FIG. 12 is a drawing showing a schematic structure of a multi-core optical fiber tape according to an embodiment of the present invention. The multi-core optical fiber tape 100 shown in FIG. 12 is constructed adopting four multi-core optical fibers 3 according to the third embodiment shown in FIG. 6, as an example.

In FIG. 12, each of the four multi-core optical fibers 3 adopted in the multi-core optical fiber tape 100 is provided, as described above, with the glass region 10 consisting of the seven core portions 11 and the cladding portion 12, the coating layer 20 provided on the outer periphery of the glass region, and the microbend applying portion 33 provided in the helical shape on the outer periphery of the coating layer 20 along the fiber longitudinal direction. The multi-core optical fiber tape 100 is provided with a resin coat 120 integrally covering buffer layers 110 provided on the respective outer peripheries of the four multi-core optical fibers 3 having the above-described structure, and the four multi-core optical fibers 3, in a state in which the multi-core optical fibers are separated at predetermined intervals from each other.

A multi-core optical fiber cable according to an embodiment of the present invention incorporates the multi-core optical fiber or multi-core optical fibers with the structure as described above. FIGS. 13A and 13B are drawings showing examples of multi-core optical fiber cables according to embodiments of the present invention, wherein FIG. 13A is a drawing showing a schematic structure of a loose cable and FIG. 13B a drawing showing a schematic structure of a tight cable.

Figure 13A:
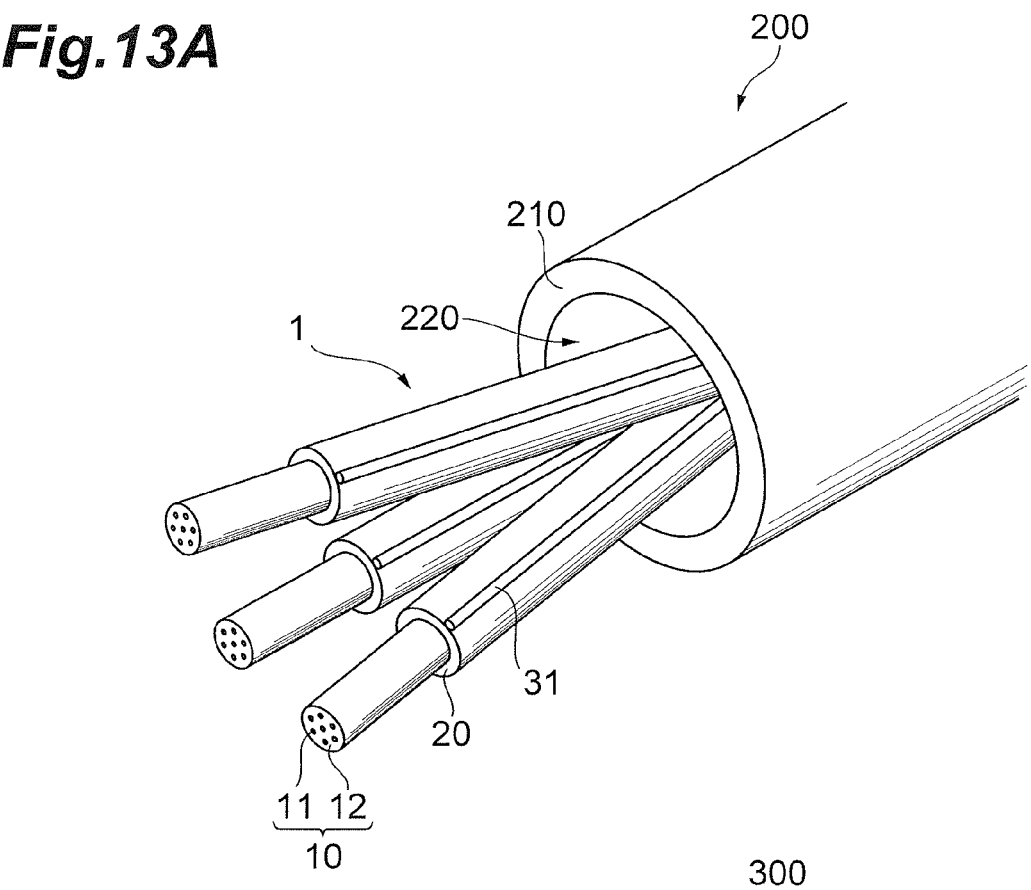
FIGS. 13A and 13B are drawings showing schematic structures of a loose cable and a tight cable, as examples of multi-core optical fiber cables according to embodiments of the present invention.

The loose cable 200 shown in FIG. 13A is constructed adopting three multi-core optical fibers 1 according to the first embodiment shown in FIG. 1, as an example.

In FIG. 13A, each of the three multi-core optical fibers 1 adopted in the loose cable 200 is provided, as described above, with the glass region 10 consisting of the seven core portions 11 and the cladding portion 12, the coating layer 20 provided on the outer periphery of the glass region, and the microbend applying portion 31 continuously provided on the outer periphery of the coating layer 20 along the fiber longitudinal direction. The loose cable 200 is provided with a sheath 210 having a space 220 to house these three multi-core optical fibers 1, without applying any lateral pressure to the respective outer peripheries of the three multi-core optical fibers 1.

Figure 13B:
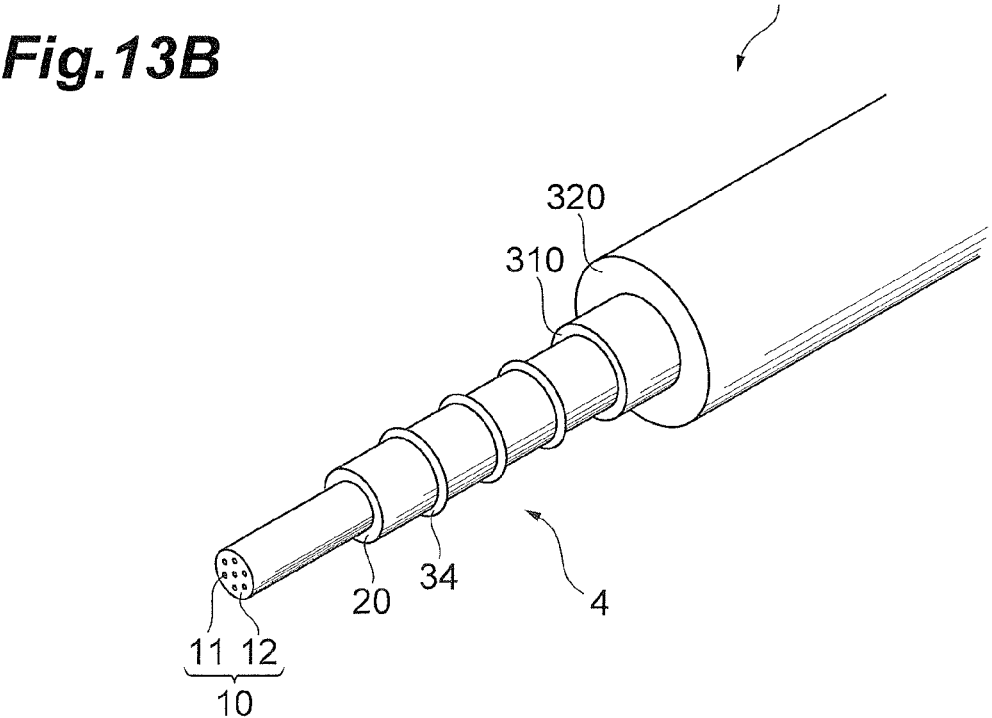

On the other hand, the tight cable 300 shown in FIG. 13B is constructed adopting the multi-core optical fiber 4 of the fourth embodiment shown in FIG. 7, as an example.

In FIG. 13B, the multi-core optical fiber 4 adopted in the tight cable 300 is provided, as described above, with the glass region 10 consisting of the seven core portions 11 and the cladding portion 12, the coating layer 20 provided on the outer periphery of the glass region, and the microbend applying portions 34 intermittently provided on the outer periphery of the coating layer 20 along the fiber longitudinal direction. The tight cable 300 is provided with a cable jacket in close contact with the outer periphery of the multi-core optical fiber 4, in order to apply a lateral pressure to the outer periphery of the multi-core optical fiber 4. In the example of FIG. 13B, the cable jacket is composed of an inner jacket 310 in direct close contact with the outer periphery of the multi-core optical fiber 4, and an outer jacket 320 provided on an outer periphery of the inner jacket 310.

The multi-core optical fiber according to the present invention successfully realizes the suppression of crosstalk on an easy and inexpensive basis.

What is claimed is:

1. A multi-core optical fiber comprising:
a plurality of core portions extending along a central axis of the fiber;
a common cladding portion constituted by a continuous region which is in direct contact with and surrounds outer peripheries of the respective core portions while the core portions within the common cladding portion are separated at predetermined intervals from each other, the common cladding portion being comprised of silica glass and having a refractive index lower than that of each of the core portions;
a coating layer surrounding an outer periphery of the common cladding portion; and
a microbend applying element provided outside an interface between the common cladding portion and the coating layer, the microbend applying element applying microbending stress to a glass region including the core portions and the common cladding portion.

2. The multi-core optical fiber according to claim 1, wherein the coating layer includes a plurality of layers, and
wherein the microbend applying element is provided at an interface between neighboring layers out of the plurality of layers.

3. The multi-core optical fiber according to claim 1, wherein a position of the microbend applying element in a cross section of the multi-core optical fiber perpendicular to the central axis at a first point on the central axis is different from a position of the micorbend applying element in a cross section of the multi-core optical fiber perpendicular to the central axis at a second point different from the first point on the central axis.

4. The multi-core optical fiber according to claim 1, wherein the microbend applying element is provided in the interior of the coating layer and contains a granular substance consisting of a material with a Young's modulus higher than that of the coating layer.

5. The multi-core optical fiber according to claim 1, wherein the micorbend applying element is provided on the outer periphery of the coating layer, and wherein a thickness of the microbend applying element in the radial direction of the multi-core optical fiber is not more than 77.5 μm.

6. The multi-core optical fiber according to claim 1, wherein the microbend applying element has a shape continuously extending in a direction along the central axis.

7. The multi-core optical fiber according to claim 1, wherein the microbend applying element includes a plurality of bend applying elements provided at least either on the outer periphery of the coating layer or in the interior of the coating layer in a state in which the bend applying elements are separated from each other in a direction along the central axis.

8. The multi-core optical fiber according to claim 1, further comprising: a plurality of depressed layers provided corresponding to the respective core portions on outer peripheries of the respective core portions,
wherein each of the depressed layers is located between the corresponding core portion and the common cladding portion and has a refractive index lower than that of the common cladding portion.

9. The multi-core optical fiber according to claim 1, further comprising:
a plurality of trench layers provided corresponding to the respective core portions on outer peripheries of the respective core portions, each trench layer being located between the corresponding core portion and the common cladding portion and having a refractive index lower than that of the common cladding portion; and
a plurality of inner cladding layers provided corresponding to the respective core portions on the outer peripheries of the respective core portions, each inner cladding layer being located between the corresponding core portion and the corresponding trench layer and having a refractive index lower than that of the corresponding core portion and higher than that of the corresponding trench layer.

10. A multi-core optical fiber tape comprising:
a plurality of multi-core optical fiber elements each having the same structure as the multi-core optical fiber as defined in claim 1; and
a resin coat integrally covering the multi-core optical fiber elements in a state in which the multi-core optical fiber elements are separated at predetermined intervals from each other.

11. A multi-core optical fiber cable incorporating the multi-core optical fiber as defined in claim 1.

12. The multi-core optical fiber cable according to claim 11, further comprising: a cable jacket in close contact with an outer periphery of the multi-core optical fiber so as to apply a lateral pressure to the outer periphery of the multi-core optical fiber.

13. The multi-core optical fiber cable according to claim 11, further comprising: a sheath having a space to house the multi-core optical fiber, without applying any lateral pressure to the outer periphery of the multi-core optical fiber.

* * * * *